United States Patent
Green et al.

(10) Patent No.: US 6,871,114 B1
(45) Date of Patent: Mar. 22, 2005

(54) UPDATING PROCESS CONTROLLER BASED UPON FAULT DETECTION ANALYSIS

(76) Inventors: Eric O. Green, 500 E. Riverside Dr., #145, Austin, TX (US) 78704; Matthew A. Purdy, 4716 Walsall Loop, Austin, TX (US) 78749; Elfido Coss, Jr., 4318 Clarno Dr., Austin, TX (US) 78749; Christopher A. Bode, 4700 Staggerbrush Rd., #738, Austin, TX (US) 78749; Robert J. Chong, 6921 Gabion Dr., Austin, TX (US) 78749; Gregory A. Cherry, 7201 Wood Hollow Dr., #408, Austin, TX (US) 78731

(*) Notice: Subject to any disclaimer, the term of this patent is extended or adjusted under 35 U.S.C. 154(b) by 0 days.

(21) Appl. No.: 10/231,713

(22) Filed: Aug. 30, 2002

(51) Int. Cl.[7] .............................................. G06F 19/00
(52) U.S. Cl. ...................... 700/175; 700/108; 700/121
(58) Field of Search ................................ 700/121, 108, 700/109, 110, 175

(56) References Cited

U.S. PATENT DOCUMENTS

| | | | | |
|---|---|---|---|---|
| 5,801,965 A | * | 9/1998 | Takagi et al. | 700/110 |
| 5,991,699 A | * | 11/1999 | Kulkarni et al. | 700/110 |
| 6,192,287 B1 | * | 2/2001 | Solomon et al. | 700/110 |
| 6,442,445 B1 | * | 8/2002 | Bunkofske et al. | 700/175 |

* cited by examiner

*Primary Examiner*—Leo Picard
*Assistant Examiner*—Charles Kasenge
(74) *Attorney, Agent, or Firm*—Williams, Morgan & Amerson, P.C.

(57) ABSTRACT

A method and an apparatus for adjusting a process controller based upon a fault detection analysis. A process step upon a workpiece is performed using a processing tool. Manufacturing data relating to processing of the workpiece is acquired. The manufacturing data may include metrology data relating to the processed workpiece and/or tool state data relating to the tool state of a processing tool. A metrology/tool state data integration process is performed based upon the acquired manufacturing data. The metrology/tool state data integration process includes performing an assessment of a tool health related to the processing tool and adjusting an emphasis of the metrology data based upon the assessment of the tool health.

37 Claims, 8 Drawing Sheets

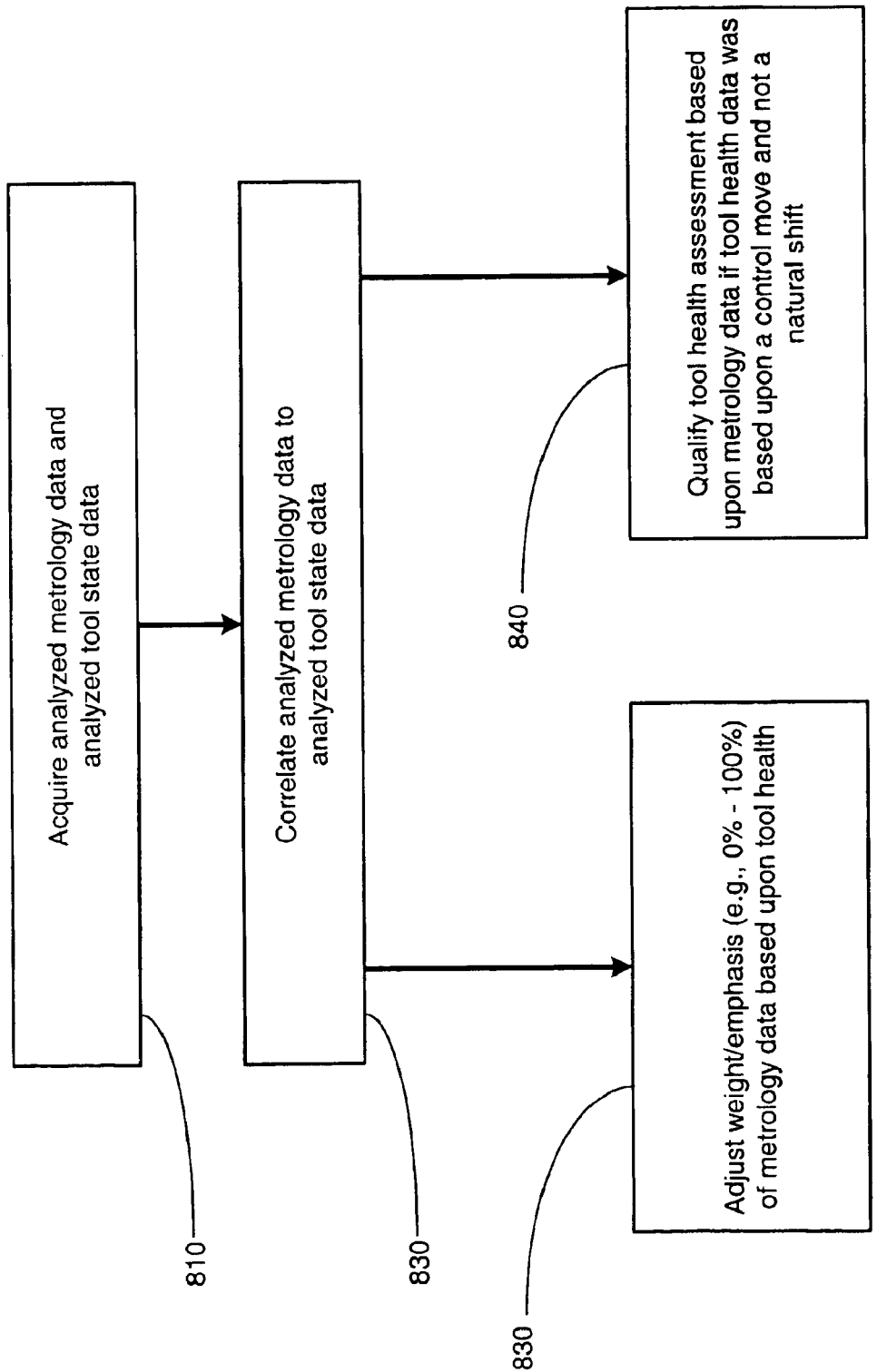

UPDATING PROCESS CONTROLLER BASED UPON FAULT DETECTION ANALYSIS

BACKGROUND OF THE INVENTION

1. Field of the Invention

This invention relates generally to semiconductor manufacturing, and, more particularly, to a method and apparatus for updating a process controller based upon a fault detection analysis.

2. Description of the Related Art

The technology explosion in the manufacturing industry has resulted in many new and innovative manufacturing processes. Today's manufacturing processes, particularly semiconductor manufacturing processes, call for a large number of important steps. These process steps are usually vital, and therefore, require a number of inputs that are generally fine-tuned to maintain proper manufacturing control.

The manufacture of semiconductor devices requires a number of discrete process steps to create a packaged semiconductor device from raw semiconductor material. The various processes, from the initial growth of the semiconductor material, the slicing of the semiconductor crystal into individual wafers, the fabrication stages (etching, doping, ion implanting, or the like), to the packaging and final testing of the completed device, are so different from one another and specialized that the processes may be performed in different manufacturing locations that contain different control schemes.

Generally, a set of processing steps is performed across a group of semiconductor wafers, sometimes referred to as a lot. For example, a process layer that may be composed of a variety of different materials may be formed across a semiconductor wafer. Thereafter, a patterned layer of photoresist may be formed across the process layer using known photolithography techniques. Typically, an etch process is then performed across the process layer using the patterned layer of photoresist as a mask. This etching process results in the formation of various features or objects in the process layer. Such features may be used as, for example, a gate electrode structure for transistors. Many times, trench isolation structures are also formed across the substrate of the semiconductor wafer to isolate electrical areas across a semiconductor wafer. One example of an isolation structure that can be used is a shallow trench isolation (STI) structure.

The manufacturing tools within a semiconductor manufacturing facility typically communicate with a manufacturing framework or a network of processing modules. Each manufacturing tool is generally connected to an equipment interface. The equipment interface is connected to a machine interface to which a manufacturing network is connected, thereby facilitating communications between the manufacturing tool and the manufacturing framework. The machine interface can generally be part of an advanced process control (APC) system. The APC system initiates a control script, which can be a software program that automatically retrieves the data needed to execute a manufacturing process.

FIG. 1 illustrates a typical semiconductor wafer 105. The semiconductor wafer 105 typically includes a plurality of individual semiconductor die 103 arranged in a grid 150. Using known photolithography processes and equipment, a patterned layer of photoresist may be formed across one or more process layers that are to be patterned. As part of the photolithography process, an exposure process is typically performed by a stepper on approximately one to four die 103 locations at a time, depending on the specific photomask employed. The patterned photoresist layer can be used as a mask during etching processes, wet or dry, performed on the underlying layer or layers of material, e.g., a layer of polysilicon, metal or insulating material, to transfer the desired pattern to the underlying layer. The patterned layer of photoresist is comprised of a plurality of features, e.g., line-type features or opening-type features that are to be replicated in an underlying process layer.

The health of a processing tool (tool health) may vary over time. The tool health may relate to an assessment of how well the processing tool operates within a predetermined specification, which may include specifications such as tool environment characteristics (e.g., tool temperature, humidity, and the like) and quality and accuracy of the process performed by the processing tool. Variations in the tool health may occur and adversely affect the quality of processed semiconductor wafers 105. Variations in the tool health may cause degradation in the operation of a processing tool.

Turning now to FIG. 2, a typical flow of processes performed on a semiconductor wafer 105 by a semiconductor manufacturing system is illustrated. A manufacturing system processes semiconductor wafers 105 (block 210). Upon processing of the semiconductor wafers 105, the manufacturing system may acquire metrology data relating to the processed semiconductor wafers 105 (block 220). The manufacturing system may then perform an analysis upon the acquired metrology data (block 230). In response to the analysis of the metrology data, the manufacturing system may calculate corrections that may be made to the process control (block 240). The manufacturing system may then implement the calculated corrections upon the process control, such as by using a feedback correction (block 250).

The manufacturing system may also acquire tool state data relating to processing of the semiconductor wafers 105 (block 270). Generally, an analysis of the acquired tool state data is then performed (block 280). The tool state data may include data, such as pressure data, temperature data, humidity data, gas flow rate data, and other manufacturing type data. Based upon the tool state data, the manufacturing system may determine the tool health (block 290). The manufacturing system then determines whether the tool health is adequate to continue processing (block 295). Upon a determination that the tool health is not adequate to continue processing, the manufacturing system may then stop processing semiconductor wafers 105 (block 297). When the manufacturing system determines that the tool health is adequate to continue processing, manufacturing of the semiconductor wafers 105 is continued (block 260).

One problem associated with the current methodology is that the metrology data may be adversely affected by a decline in the tool health. In other words, the metrology data may not accurately reflect the actual accuracy of the parameters used to process the semiconductor wafers 105. Therefore, when a processing tool experiences a decline in the tool health, metrology data is affected and an incorrect amount of compensation or correction that otherwise would not have been applied, may be implemented as a result. This may lead to excessive corrections that may not provide accurately processed wafers.

Furthermore, a significant control modification may be implemented, which may affect the metrology data. However, the resultant change in metrology data combined with the analysis performed on the tool state data may cause the manufacturing system to interpret that a decline in the tool health has taken place; even though the tool state data may be reflecting a substantial change in the process control. This will result in misdiagnoses of the tool health, which may result in mis-processing of semiconductor wafers 105.

The present invention is directed to overcoming, or at least reducing, the effects of, one or more of the problems set forth above.

SUMMARY OF THE INVENTION

In one aspect of the present invention, a method is provided for adjusting a process controller based upon a fault detection analysis. A process step upon a workpiece is performed using a processing tool. Manufacturing data relating to processing of the workpiece is acquired. The manufacturing data may include metrology data relating to the processed workpiece and/or tool state data relating to the tool state of a processing tool. A metrology/tool state data integration process is performed based upon the acquired manufacturing data. The metrology/tool state data integration process includes performing an assessment of a tool health related to the processing tool and adjusting an emphasis of the metrology data based upon the assessment of the tool health.

In another aspect of the present invention, a system is provided for adjusting a process controller based upon a fault detection analysis. The system comprises a processing tool to process a workpiece. The system also includes a process controller operatively coupled to the processing tool. The process controller is adapted to perform a metrology/tool state data integration process based upon metrology data relating to the processed workpiece and tool state data relating to the processing tool. The metrology/tool state data integration process includes performing an assessment of a tool health related to the processing tool and adjusting an emphasis of the metrology data based upon the assessment of the tool health.

In another aspect of the present invention, an apparatus is provided for adjusting a process controller based upon a fault detection analysis. The apparatus comprises a process controller operatively coupled to the processing tool. The process controller is adapted to perform a metrology/tool state data integration process based upon metrology data relating to the processed workpiece and tool state data relating to the processing tool. The metrology/tool state data integration process includes performing an assessment of a tool health related to the processing tool and adjusting an emphasis of the metrology data based upon the assessment of the tool health.

In yet another aspect of the present invention, a computer readable program storage device encoded with instructions is provided for adjusting a process controller based upon a fault detection analysis. A computer readable program storage device encoded with instructions that, when executed by a computer, performs a method, which comprises performing a process step upon a workpiece using a processing tool; acquiring manufacturing data relating to processing of the workpiece, the manufacturing data comprising metrology data relating to the processed workpiece and tool state data relating to the tool state of a processing tool; performing a metrology/tool state data integration process based upon the acquired manufacturing data, the metrology/tool state data integration process comprising performing an assessment of a tool health related to the processing tool and adjusting an emphasis of the metrology data based upon the assessment of the tool health.

BRIEF DESCRIPTION OF THE DRAWINGS

The invention may be understood by reference to the following description taken in conjunction with the accompanying drawings, in which like reference numerals identify like elements, and in which:

FIG. 8 illustrates a more detailed flowchart depiction of a method of performing a metrology/tool state data integration process, as indicated in FIG. 7, in accordance with one illustrative embodiment of the present invention.

Figure 1:
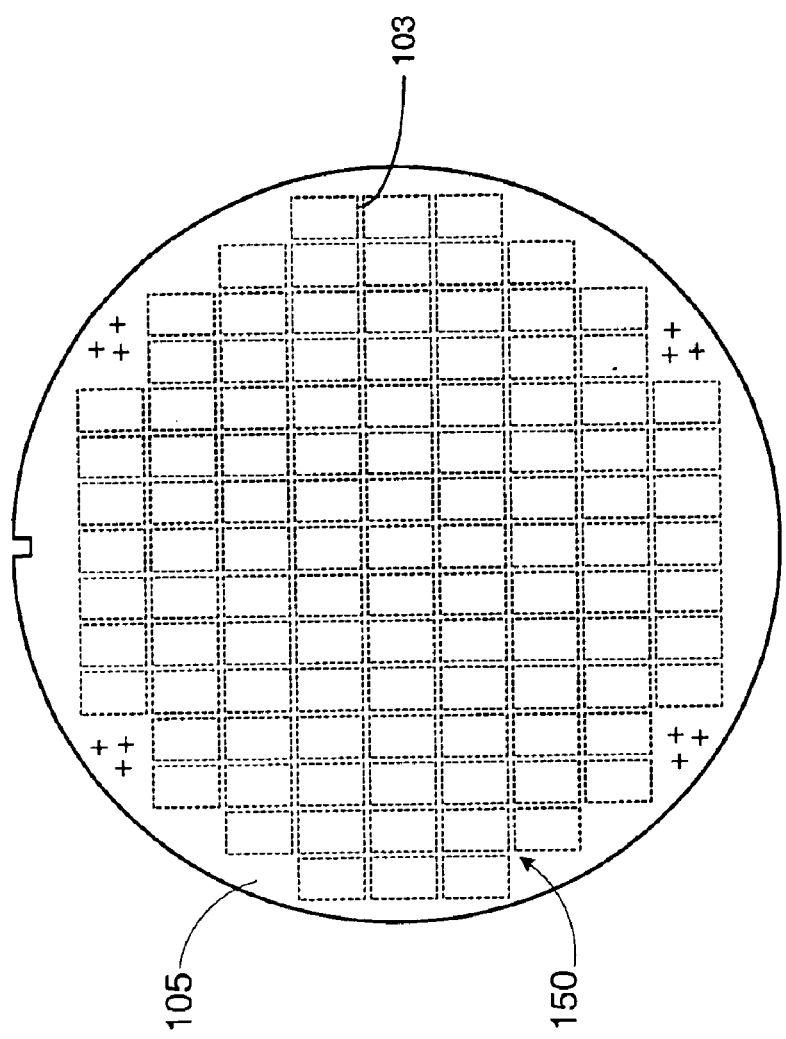
FIG. 1 is a simplified diagram of a prior art semiconductor wafer being processed.
Figure 2:
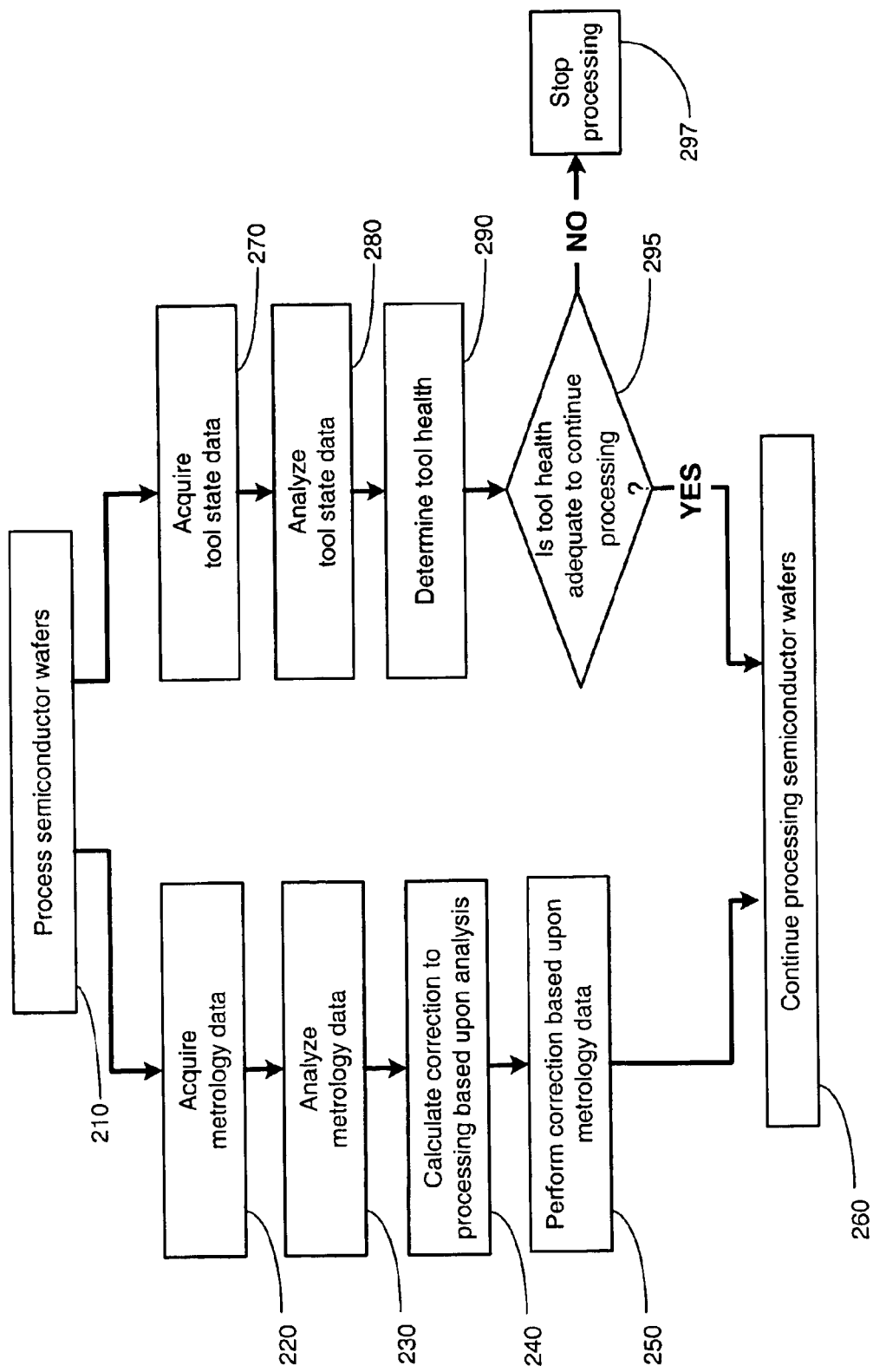
FIG. 2 illustrates a simplified flowchart depiction of a prior art process flow during manufacturing of semiconductor wafers.

While the invention is susceptible to various modifications and alternative forms, specific embodiments thereof have been shown by way of example in the drawings and are herein described in detail. It should be understood, however, that the description herein of specific embodiments is not intended to limit the invention to the particular forms disclosed, but on the contrary, the intention is to cover all modifications, equivalents, and alternatives falling within the spirit and scope of the invention as defined by the appended claims.

DETAILED DESCRIPTION OF SPECIFIC EMBODIMENTS

Illustrative embodiments of the invention are described below. In the interest of clarity, not all features of an actual implementation are described in this specification. It will of course be appreciated that in the development of any such actual embodiment, numerous implementation-specific decisions must be made to achieve the developers' specific goals, such as compliance with system-related and business-related constraints, which will vary from one implementation to another. Moreover, it will be appreciated that such a development effort might be complex and time-consuming, but would nevertheless be a routine undertaking for those of ordinary skill in the art having the benefit of this disclosure.

There are many discrete processes that are involved in semiconductor manufacturing. Many times, workpieces (e.g., semiconductor wafers 105, semiconductor devices, etc.) are stepped through multiple manufacturing process tools. Embodiments of the present invention provide for integrating metrology data analysis and tool health analysis for improving processing of semiconductor wafers. Fault detection analysis that provides indications relating to the tool health, operations of the process steps being performed on the semiconductor wafer 105, etc., are integrated with metrology data analysis to provide a more accurate assessment of the quality of operations of the manufacturing system. Analysis of metrology data is interfaced with tool health analysis, such that the metrology data analysis is further qualified before correction(s) to a process control is performed. Similarly, the assessment of tool health may be qualified by examining the metrology data, which may indicate that a substantial process control change has been performed. This process control change may cause a change in the tool state data, indicating a process control change, which may then be used to promote a less severe tool health diagnosis, thereby, reducing the possibility of a misdiagnosis of the tool health. Integrating the metrology data analysis and the tool health analysis may provide for more accurate assessment of the affect of metrology data on a process control due in reaction to a tool health diagnosis. Embodiments of the present invention may be implemented such that more accurate reaction to metrology data analysis and tool health analysis are made.

Figure 3:
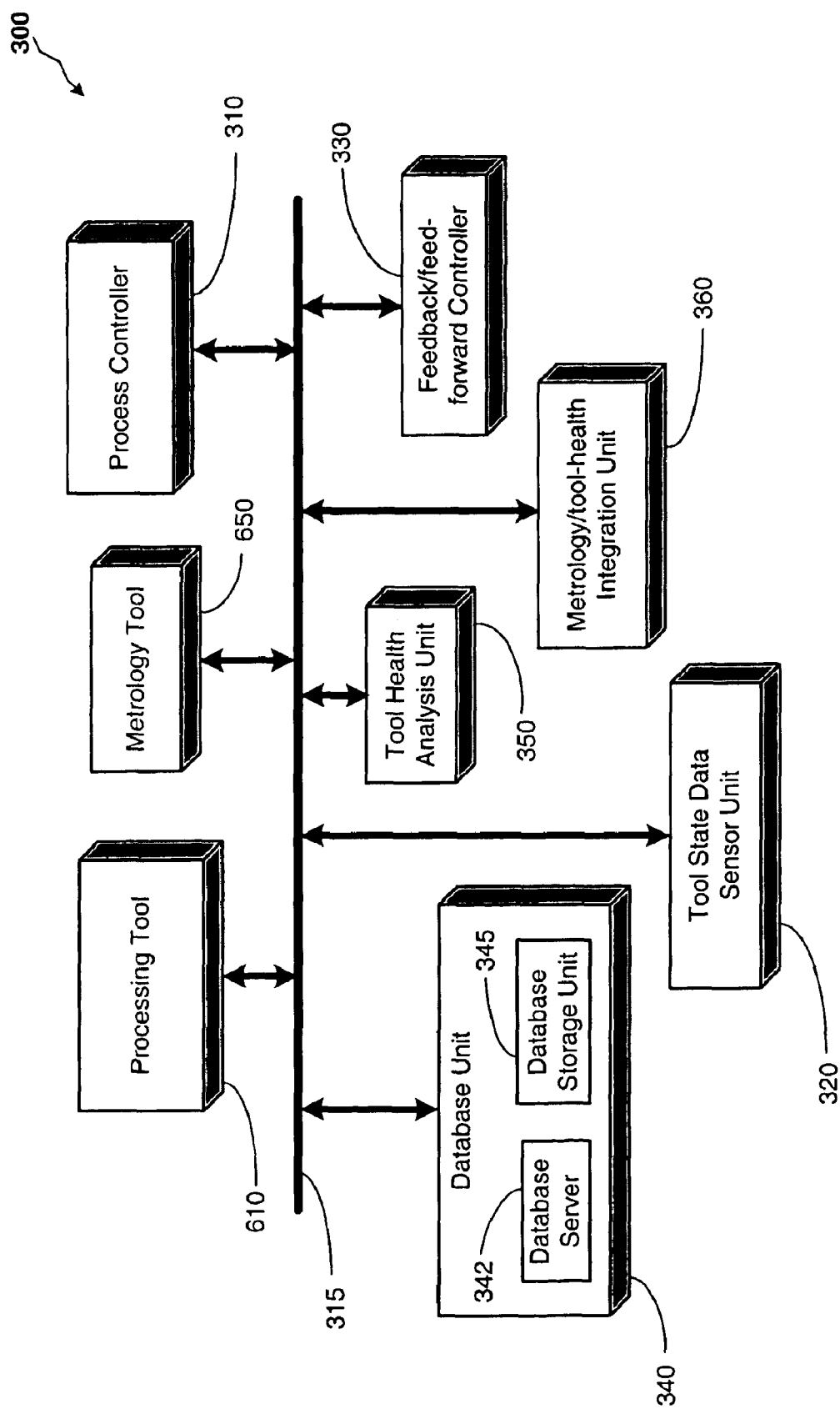
FIG. 3 provides a block diagram representation of a system in accordance with one illustrative embodiment of the present invention.

Turning now to FIG. 3, a system 300 in accordance with embodiments of the present invention is illustrated. A process controller 310 in the system 300 is capable of controlling various operations relating to a processing tool 610. The system 300 is capable of acquiring manufacturing related data, such as metrology data related to processed semiconductor wafers 105, tool state data, and the like. The system 300 may also comprise a metrology tool 650 to acquire metrology data related to the processed semiconductor wafers 105.

The system 300 may also comprise a database unit 340. The database unit 340 is provided for storing a plurality of types of data, such as manufacturing-related data, data related to the operation of the system 300 (e.g., the status of the processing tool 610, the status of semiconductor wafers 105, etc.). The database unit 340 may store tool state data relating to a plurality of process runs performed by the processing tool 610. The database unit 340 may comprise a database server 342 for storing tool state data and/or other manufacturing data related to processing semiconductor wafers 105, into a database storage unit 345. Manufacturing data may include metrology data related to processed semiconductor wafers 105 and/or tool state data related to one or more processing tools 610.

The system 300 may also comprise a tool state data sensor unit 320 for acquiring tool state data. The tool state data may include pressure data, temperature data, humidity data, gas flow data, various electrical data, and the like. Exemplary tool state data for an etch tool may include gas flow, chamber pressure, chamber temperature, voltage, reflected power, backside helium pressure, RF tuning parameters, etc. The tool state data may also include data external to the processing tool 610, such as ambient temperature, humidity, pressure, etc. A more detailed illustration and description of the tool state data sensor unit 320 is provided in FIG. 4 and accompanying description below.

The system also comprises a feedback/feed forward controller 330. The feedback/feed forward controller 330 is capable of implementing control system corrections to the process operations performed on semiconductor wafers 105. The feedback/feed forward controller 330 is capable of analyzing metrology data and calculating corrections for compensating and/or correcting errors relating to the processed semiconductor wafers 105. The feedback/feed forward controller 330 may perform feedback corrections to the operation of the processing tool 610 by providing feedback data to process controller 310. The feedback/feed forward controller 330 may also compensate for errors detected by analyzing the metrology data by providing feed-forward data to the process controller 310. The feedback/feed forward controller 330 may perform run-to-run control of semiconductor wafers 105 (e.g., corrections to process operations on a batch-to-batch basis) and/or a wafer-to-wafer control of wafer processing (e.g., correction to process operations to one or more semiconductor wafers within a batch/lot, based upon assessment of one or more processed semiconductor wafers 105 in the same batch/lot).

The system 300 also comprises a tool health analysis unit 350. The tool health analysis unit 350 is capable of analyzing manufacturing data, such as tool state sensor data and assessing the tool health of one or more processing tools 610. The tool health analysis unit 350 may perform a fault detection analysis to determine tool health. The tool health analysis unit 350 generates data relating to the tool health of a processing tool 610. The system 300 also comprises a metrology/tool-health integration unit 360. The metrology/tool-health integration unit 360 is capable of integrating the metrology data and the data relating to the tool health, and performing an analysis that provides for quantification of feedback and/or feed-forward control of processing steps performed on the semiconductor wafers 105. The metrology/tool health integration unit 360 provides for increasing or decreasing the relative weight assigned to the metrology data that is used to perform feedback or feed forward control adjustments. For example, it the tool health is found to be relatively well, a large weight (or emphasis) may be placed upon the metrology data. If the tool health is found to be relatively low, a low weight (or emphasis) may be placed upon the metrology data (e.g., only a 40% emphasis on the metrology data, versus a 100% emphasis on the metrology data).

Furthermore, the metrology/tool health integration unit 360 may provide data to the tool health analysis unit 350 indicating that a substantial control modification may have taken place, thereby, prompting the tool health analysis unit 350 to reduce the influence of the tool state sensor data regarding how it affects the tool health diagnosis. If a substantial control modification has been implemented, the tool state sensor data may provide data that may indicate that the tool health is relatively low. However, by considering the metrology data (i.e., integrating metrology with tool health), which may indicate that a substantial control modification has taken place, a lower emphasis on the changes in the tool state data may be made, thereby assessing the tool health more accurately. A more detailed illustration and description of the metrology/tool health integration unit 360 is provided in FIG. 5 and accompanying description below.

The process controller 310, the feedback/feed-forward controller 330, the tool health analysis unit 350, and/or the metrology/tool-health integration unit 360, may be software, hardware, or firmware units that are standalone units or may be integrated into a computer system associated with the system 300. Furthermore, the various components represented by the blocks illustrated in FIG. 3 may communicate with one another via a system communications line 315. The system communications line 315 may be a computer bus link, a dedicated hardware communications link, a telephone system communications link, a wireless communications link, or other communication links that may be implemented by those skilled in the art having benefit of the present disclosure.

Figure 4:
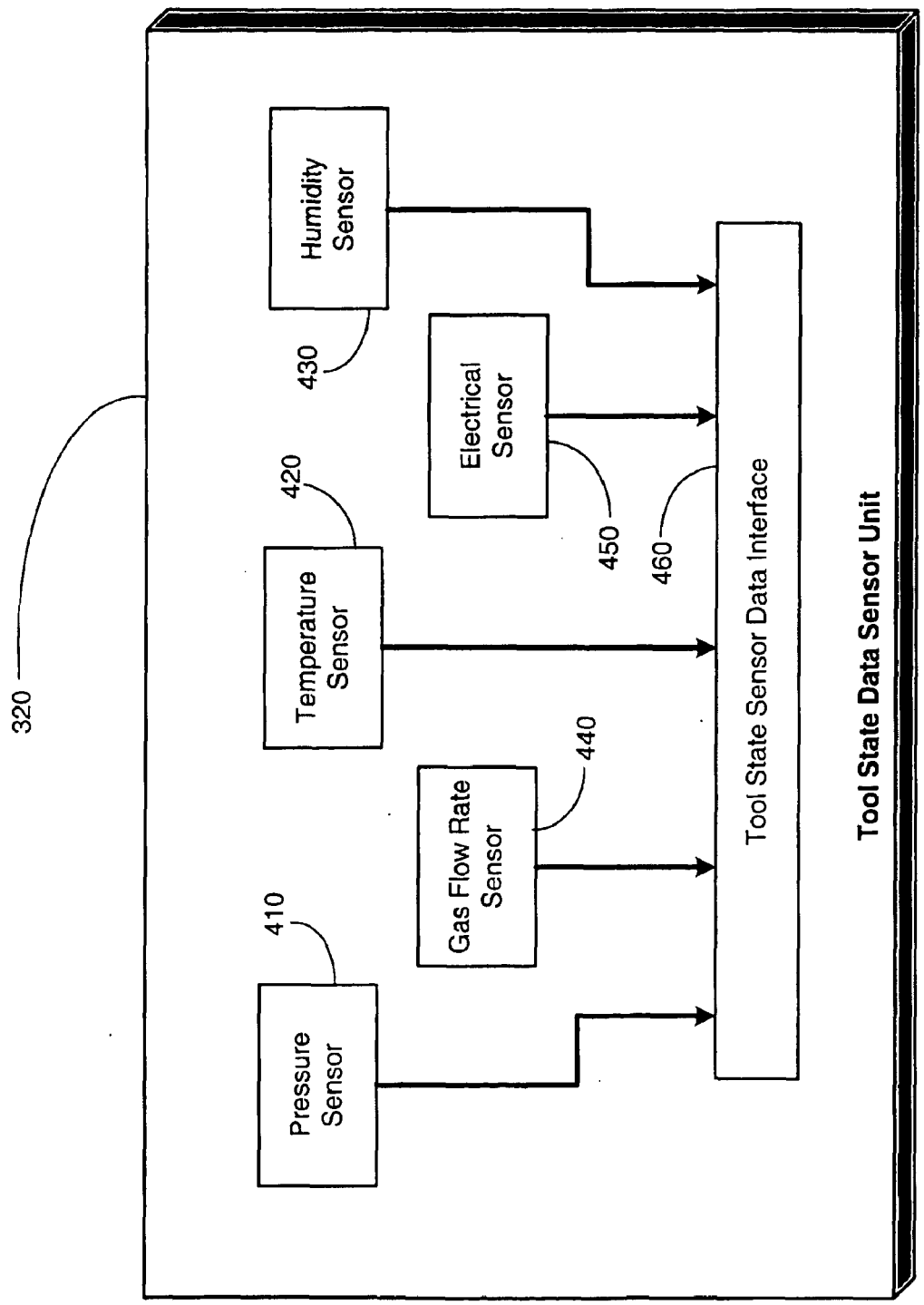
FIG. 4 illustrates a more detailed block diagram representation of a tool state data sensor unit of FIG. 3, in accordance with one illustrative embodiment of the present invention.

Turning now to FIG. 4, a more detailed block diagram depiction of the tool state data sensor unit 320 illustrated in FIG. 3 is provided. The tool state data sensor unit 320 may comprise any of a variety of different types of sensors, e.g., a pressure sensor 410, a temperature sensor 420, a humidity sensor 430, a gas flow rate sensor 440, and an electrical sensor 450, etc. The pressure sensor 410 is capable of detecting the pressure within the processing tool 610. The temperature sensor 420 is capable of sensing the temperature of various portions of the processing tool 610. The humidity sensor 430 is capable of detecting the relative humidity at various portions in the processing tool 610, or of the surrounding ambient conditions. The gas flow rate sensor 440 may comprise a plurality of flow-rate sensors that are capable of detecting the flow-rate of a plurality of process gases utilized during processing of semiconductor wafers 105. For example, the gas flow rate sensor 440 may comprise sensors that can detect the flow rate of gases such as $NH_3$, $SiH_4$, $N_2$, $N_2O$, and/or other process gases.

In one embodiment, the electrical sensor 450 is capable of detecting a plurality of electrical parameters, such as the current provided to a lamp used in a photolithography process. The tool state data sensor unit 320 may also comprise other sensors capable of detecting a variety of manufacturing variables known to those skilled in the art having benefit of the present disclosure. The tool state data sensor unit 320 may also comprise a tool state sensor data interface 460. The tool state sensor data interface 460 may receive sensor data from the various sensors that are contained within, or associated with, the processing tool 610 and/or tool state data sensor unit 320 and transmit the data to the process controller 310.

Figure 5:
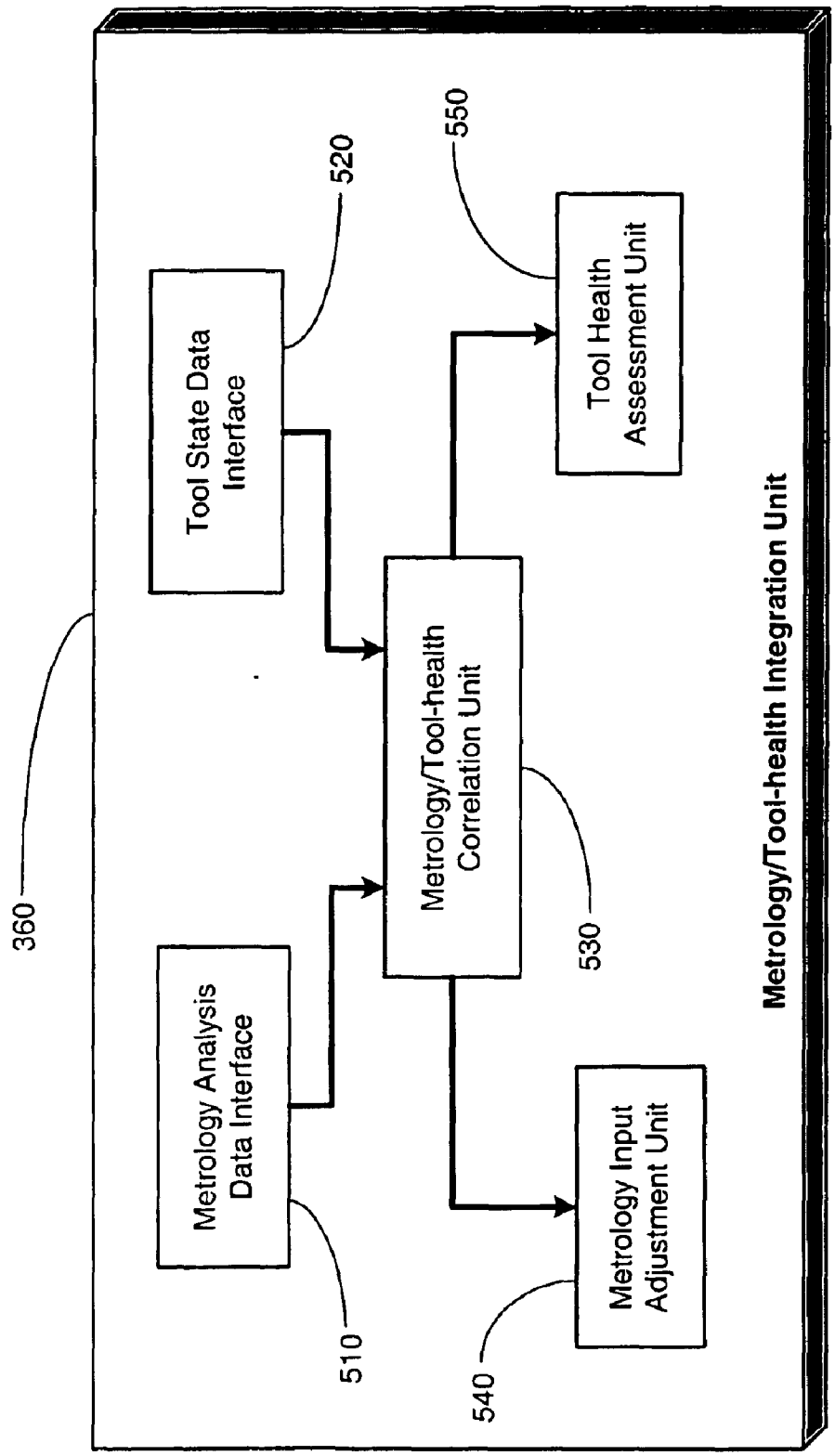
FIG. 5 illustrates a more detailed block diagram representation of a metrology/tool-health integration unit of FIG. 3, in accordance with one illustrative embodiment of the present invention.

Turning now to FIG. 5, a block diagram depiction of the metrology/tool-health integration unit 360, in accordance with one embodiment of the present invention, is illustrated. The metrology/tool-health integration unit 360 may comprise a metrology analysis data interface 510 and a tool state data interface 520 for receiving metrology analysis data and tool state data, respectively. The metrology/tool-health integration unit 360 may also comprise a metrology/tool-health correlation unit 530. The metrology/tool health correlation unit 530 correlates particular sets of analyzed metrology data to corresponding tool state data for associating certain process behavior to particular tool states.

An algorithm associated with the metrology/tool-health integration unit 360 may analyze the correlation between certain metrology analysis data and tool state data and examine their relationship. Based upon the relationship between metrology data analysis and tool state data analysis, a metrology impact adjustment unit 540 may assign a particular weight/emphasis to the metrology data analysis performed by the system 300. For example, based upon certain tool state data that indicates an inferior tool health, particular metrology measurements (e.g., critical dimension measurements) may be discounted or only counted as a partial factor in performing process adjustments. Therefore, when feedback and/or feed-forward adjustments are made to process control operations, the impact of the metrology data upon the adjustments are reduced, since the metrology data may be tainted by inferior tool health.

Additionally, the metrology analysis data and the tool state data correlation may be used to assess the tool health, which may be performed by a tool health assessment unit 550. The tool health assessment unit 550 may change an initial diagnosis of the tool health based upon the fact that the metrology data may indicate that a substantial control operation change has been made. Therefore, the resulting substantial change in the tool state data may be discounted. The metrology/tool health integration unit 360 may provide an adjusted metrology data and/or adjusted tool health assessment to the process controller 310.

Figure 6:
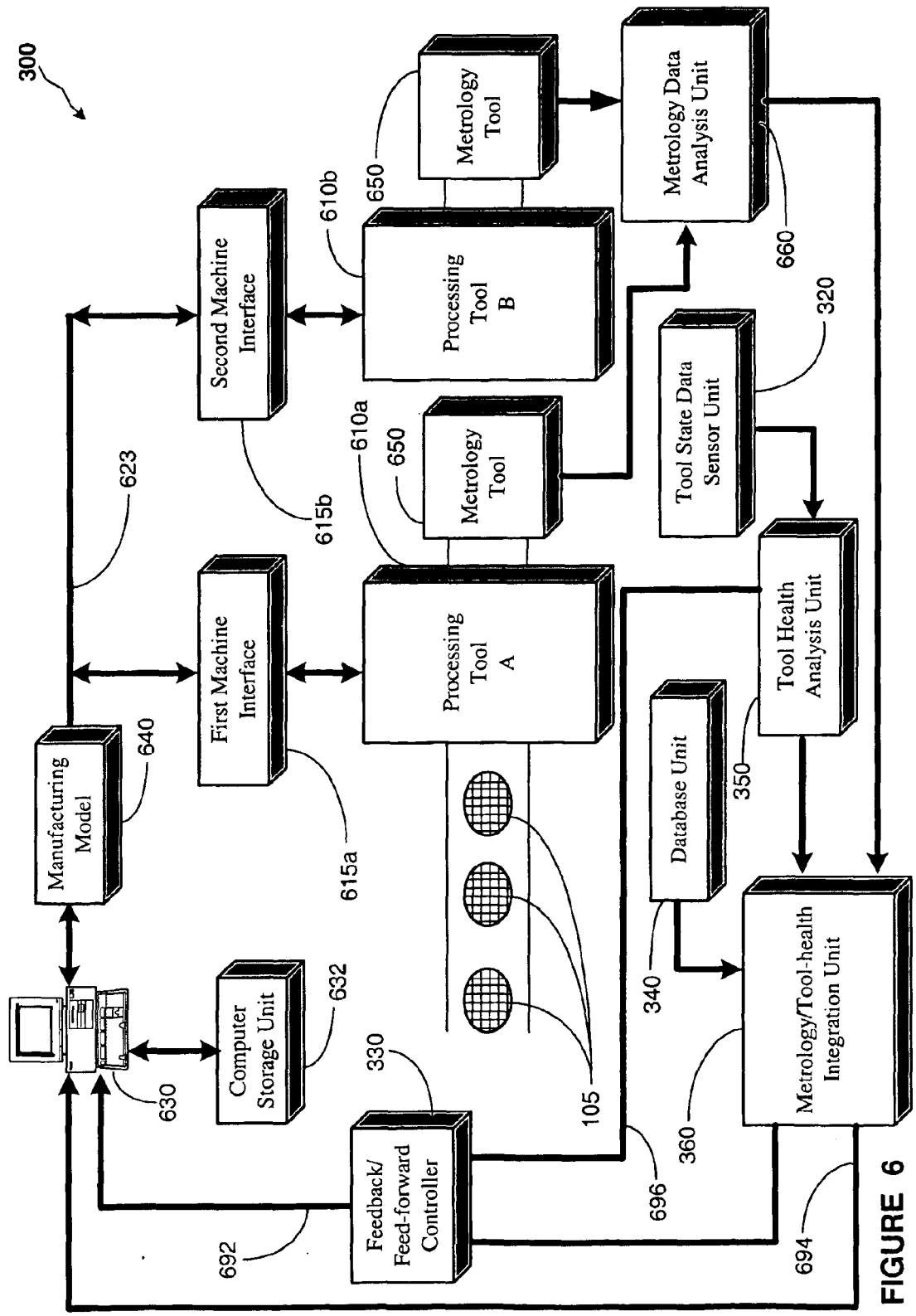
FIG. 6 illustrates a more detailed block diagram representation of the system shown in FIG. 3, in accordance with one illustrative embodiment of the present invention.

Turning now to FIG. 6, a more detailed block diagram of the system 300 in accordance with one embodiment of the present invention is illustrated. Semiconductor wafers 105 are processed on processing tools 610a, 610b using a plurality of control input signals, or manufacturing parameters, provided via a line or network 623. The control input signals, or manufacturing parameters, on the line 623 are sent to the processing tools 610a, 610b from a computer system 630 via machine interfaces 615a, 615b. The first and second machine interfaces 615a, 615b are generally located outside the processing tools 610a, 610b. In an alternative embodiment, the first and second machine interfaces 615a, 615b are located within the processing tools 610a, 610b. The semiconductor wafers 105 are provided to and carried from a plurality of processing tools 610. In one embodiment, semiconductor wafers 105 may be provided to a processing tool 610 manually. In an alternative embodiment, semiconductor wafers 105 may be provided to a processing tool 610 in an automatic fashion (e.g., robotic movement of semiconductor wafers 105). In one embodiment, a plurality of semiconductor wafers 105 is transported in lots (e.g., stacked in cassettes) to the processing tools 610.

In one embodiment, the computer system 630 sends control input signals, or manufacturing parameters, on the line 623 to the first and second machine interfaces 615a, 615b. The computer system 630 is capable of controlling processing operations. In one embodiment, the computer system 630 is a process controller. The computer system 630 is coupled to a computer storage unit 632 that may contain a plurality of software programs and data sets. The computer system 630 may contain one or more processors (not shown) that are capable of performing the operations described herein. The computer system 630 employs a manufacturing model 640 to generate control input signals on the line 623. In one embodiment, the manufacturing model 640 contains a manufacturing recipe that determines a plurality of control input parameters that are sent on the line 623 to the processing tools 610a, 610b.

In one embodiment, the manufacturing model 640 defines a process script and input control that implement a particular manufacturing process. The control input signals (or control input parameters) on the line 623 that are intended for processing tool A 610a are received and processed by the first machine interface 615a. The control input signals on the line 623 that are intended for processing tool B 610b are received and processed by the second machine interface 615b. Examples of the processing tools 610a, 610b used in semiconductor manufacturing processes are steppers, etch process tools, deposition tools, and the like.

One or more of the semiconductor wafers 105 that are processed by the processing tools 610a, 610b can also be sent to a metrology tool 650 for acquisition of metrology data. The metrology tool 650 may be a scatterometry data acquisition tool, an overlay-error measurement tool, a critical dimension measurement tool, and the like. In one embodiment, a metrology tool 650 examines one or more processed semiconductor wafers 105. The metrology data analysis unit 660 may collect, organize, and analyze data from the metrology tool 650. The metrology data is directed to a variety of physical or electrical characteristics of the devices formed across the semiconductor wafers 105. For example, metrology data may be obtained as to line width measurements, depth of trenches, sidewall angles, thickness, resistance, and the like. Metrology data may be used to determine faults that may be present across the processed semiconductor wafers 105, which may be used to quantify the performance of the processing tools 610.

The metrology/tool health integration unit 360 may receive data from the metrology data analysis unit 660, data from the database 340, and/or data from the tool health analysis unit 350. The tool health assessment unit 550 in the metrology/tool-health integration unit 360 receives data from the tool state data sensor unit 320 in order to provide an assessment of the initial tool health. The metrology/tool health integration unit 360 may then adjust certain parameters, which otherwise may have been used to overcompensate process adjustments, to the feedback/feed forward controller 330. The feedback/feed-forward controller 330 may send qualified or scaled down process control adjustment data to the computer system 630 on a line 692. The computer system 630 may then use the data on the line 692 to perform or implement changes in the overall operation of the system 300. The metrology/tool health integration unit 360 may also provide qualified/adjusted tool health data to the computer system 630 on a line 694. The tool health data then may be used by the system 300 to improve operations of the processing tools 610.

Additionally, the feedback/feed-forward controller 330 may implement changes in the process operations performed by the system 300. The process changes implemented by the feedback/feed-forward controller 330 may include making substantial changes to a recipe associated with process operations performed by the system 300. The process changes may cause a shift in the process operation(s) performed by the system 300. The shift in the process operation(s) may cause an impact to any fault detection analysis performed by the system 300. For example, a fault detection algorithm, which may be integrated in the metrology/tool health integration unit 360, may be impacted by the process shift implemented by the feedback/feed-forward controller 330. However, communications between the tool health analysis unit 350 and the feedback/feed-forward controller 330 (e.g., communications on a line 696) would allow the tool health analysis unit 350 to determine that the impact caused by the intentional process shift implemented by the feedback/feed-forward controller 330 is not an actual fault, but merely the result of an intentional process shift.

Figure 7:
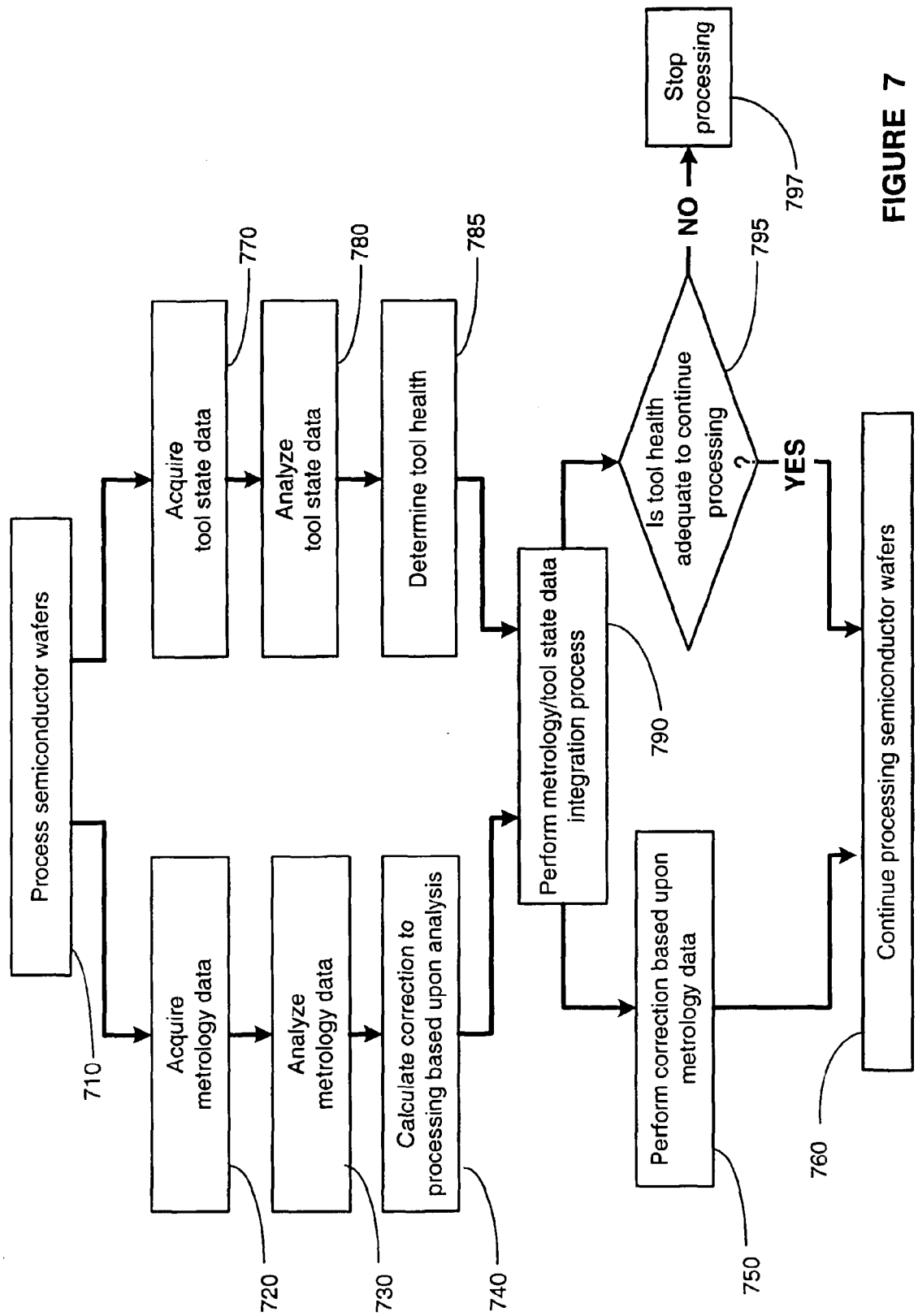
FIG. 7 illustrates a flowchart depiction of a method in accordance with one illustrative embodiment of the present invention.

Turning now to FIG. 7, a flow chart depiction of the method in accordance with embodiments of the present invention is provided. The system 300 processes semiconductor wafers 105 (block 710). The system 300 may then acquire metrology data relating to the processed semiconductor wafers 105 (block 720). The acquired metrology data may then be sent through an analysis process to generate analyzed metrology data (block 730). The analyzed metrology data may include an analysis of certain parameters that are measured, such as film thickness, critical dimension measurements of features formed on the semiconductor wafers 105, etc. The system 300 may also acquire tool state data (block 770). The tool state data may be acquired by the tool state data sensor unit 320, which may include pressure data, humidity, data, temperature data, gas flow rate data, etc. The system 300 may then perform an analysis upon the tool state data (block 780). The analysis of the tool state data may include generating an initial or temporary assessment of the tool health (block 785).

Upon analyzing the metrology data and the tool state data, the system 300 may perform a metrology/tool state data integration process (block 790). A more detailed illustration and description of performing the metrology/tool state data integration process indicated in block 790 is provided in FIG. 8 and accompanying description below. The metrology/tool state data integration process may result in a qualified or adjusted assessment of data relating to performing feedback or feed forward correction(s). Furthermore, the metrology/tool state data integration process may also result in a tool health assessment that may be qualified by certain factors, such as the sudden change in the metrology data due to a substantial change in the control parameters. The assessment of the tool health may be calculated using fault detection techniques that include analyzing the tool state data relating to the processing tool 610 and/or the results of the processing of certain semiconductor wafers 105.

The system 300 may perform the feedback/feed forward correction based upon the qualified assessment from the metrology/tool state data integration process (block 750). Additionally, the system 300 may make a determination whether the tool health is adequate to continue processing based upon the revised or adjusted tool health assessment provided by the metrology/tool state data integration process (block 795). When the system 300 determines that the tool health is not adequate to continue processing the system 300 may stop processing the semiconductor wafers 105 (block 797). When the system 300 determines that the tool health is adequate to continue processing (block 795) and/or upon performing feedback/feed-forward corrections (block 750), the system 300 may continue processing semiconductor wafers 105 (block 760).

Turning now to FIG. 8, a flow chart depiction of one embodiment of performing the metrology/tool state data integration process in block 790 is provided. The system 300 acquires analyzed metrology data and tool state data (block 810). The analyzed metrology data and the tool state data are correlated to determine whether certain metrology data events are related to particular tool state behaviors detected. The correlation of the metrology data and the tool state data may be executed by an algorithm that may develop a relationship between particular analysis of metrology data and particular tool state conditions (block 820).

Based upon such correlation(s), the system 300 may adjust the weight/emphasis of the metrology data based upon certain tool health. For example, if a fault detection or tool state is considered to cause the tool health to be substantially low, the weight assigned to the metrology data may be reduced by a factor of 50% such that erroneous compensation (feedback and/or feed forward) may not be implemented. If the tool health is considered to be high, then the weight assigned to the metrology data may also be set high (e.g., 90%), which generally indicates that the tool health is substantially high and therefore errors detected using metrology data may be used to fully calculate control adjustments.

Furthermore, the tool health assessment may be qualified based upon a finding that a large change in metrology data has been detected due to a substantial control adjustment, therefore, the probability of overreaction to the assessment of the tool health is reduced. This is primarily true because the processing tool 610 may be functioning properly but in response to the control adjustment, an assessment of the tool health may show substantial deviation from normal operating parameters. An assessment is made whether the substantial changes to the metrology data was based upon a control adjustment or a natural variation in the tool operation. A natural variation in the tool operation may cause a substantial change in the metrology data. If the tool state data indicates that the tool health is low, then such estimation is validated. Using the steps described in FIG. 8, a weight-adjusted metrology analysis and a qualified tool health assessment is provided. The completion of the steps indicated in FIG. 8 substantially completes the process of performing the metrology/tool state data integration process indicated in block 790 of FIG. 7.

Utilizing embodiments of the present invention, a more accurate implementation of feedback and/or feed forward corrections are possible since the metrology data used to calculate control adjustments is adjusted based upon fault detection and/or other calculations that provide an assessment of the tool health. Furthermore, embodiments of the present invention allow for a more accurate and qualified assessment of the tool health based upon a relationship between the tool health and the metrology data, which may indicate that a particular control adjustment may be used to qualify the assessment of the tool health. Therefore, utilizing embodiments of the present invention, more accurate processing and performing feedback/feed forward adjustments may be made possible.

The principles taught by the present invention can be implemented in an Advanced Process Control (APC) Framework, such as a Catalyst system offered by KLA Tencor, Inc. The Catalyst system uses Semiconductor Equipment and Materials International (SEMI) Computer Integrated Manufacturing (CIM) Framework compliant system technologies, and is based on the Advanced Process Control (APC) Framework. CIM (SEMI E81-0699-Provisional Specification for CIM Framework Domain Architecture) and APC (SEMI E93-0999-Provisional Specification for CIM Framework Advanced Process Control Component) specifications are publicly available from SEMI. The APC framework is a preferred platform from which to implement the control strategy taught by the present invention. In some embodiments, the APC framework can be a factory-wide software system; therefore, the control strategies taught by the present invention can be applied to virtually any of the semiconductor manufacturing tools on the factory floor. The APC framework also allows for remote access and monitoring of the process performance. Furthermore, by utilizing the APC framework, data storage can be more convenient, more flexible, and less expensive than local drives. The APC framework allows for more sophisticated types of control because it provides a significant amount of flexibility in writing the necessary software code.

Deployment of the control strategy taught by the present invention onto the APC framework could require a number of software components. In addition to components within the APC framework, a computer script is written for each of the semiconductor manufacturing tools involved in the control system. When a semiconductor manufacturing tool in the control system is started in the semiconductor manufacturing fab, it generally calls upon a script to initiate the action that is required by the process controller, such as the overlay controller. The control methods are generally defined and performed in these scripts. The development of these scripts can comprise a significant portion of the development of a control system. The principles taught by the present invention can be implemented into other types of manufacturing frameworks.

The particular embodiments disclosed above are illustrative only, as the invention may be modified and practiced in different but equivalent manners apparent to those skilled in the art having the benefit of the teachings herein. Furthermore, no limitations are intended to the details of construction or design herein shown, other than as described in the claims below. It is therefore evident that the particular embodiments disclosed above may be altered or modified and all such variations are considered within the scope and spirit of the invention. Accordingly, the protection sought herein is as set forth in the claims below.

What is claimed is:

1. A method, comprising:
performing a process step upon a workpiece using a processing tool;
acquiring manufacturing data relating to processing of said workpiece, said manufacturing data comprising metrology data relating to said processed workpiece and tool state data relating to the tool state of the processing tool; and
performing a metrology/tool state data integration process based upon said acquired manufacturing data, said metrology/tool state data integration process comprising performing an assessment of a tool health related to said processing tool and adjusting an emphasis of said metrology data based upon said assessment of said tool health.

2. The method of claim 1, wherein performing said process step upon said workpieces further comprises performing said process step upon a semiconductor wafer.

3. The method of claim 1, further comprising qualifying said assessment of said tool health based upon an analysis performed upon said metrology data.

4. The method of claim 1, further comprising performing a feedback adjustment to an operation relating to said processing tool based upon said adjusted metrology data.

5. The method of claim 1, further comprising performing a feed-forward adjustment to an operation relating to another processing tool based upon said adjusted metrology data.

6. The method of claim 5, wherein qualifying said assessment of said tool health based upon an analysis performed upon said metrology data further comprises increasing a tool health indication in response to a determination that a control modification was implemented based upon said analysis performed upon said metrology data.

7. The method of claim 1, wherein performing an assessment of a tool health related to said processing tool further comprises performing an assessment of a tool health based upon said tool state data.

8. The method of claim 1, wherein acquiring manufacturing data relating to processing of said workpiece further comprises acquiring metrology data relating to the critical dimension relating to a feature formed upon said semiconductor wafer.

9. The method of claim 1, wherein acquiring manufacturing data relating to processing of said workpiece further comprises acquiring metrology data relating to a thickness associated with a layer formed upon said semiconductor wafer.

10. The method of claim 1, wherein acquiring said metrology data relating to said processed workpiece further comprises acquiring metrology data using a metrology tool.

11. The method of claim 1, wherein acquiring said tool state data relating to said processed workpiece further comprises acquiring at least one of a temperature data, a humidity data, a pressure data, and a gas flow rate data.

12. The method of claim 1, wherein performing a metrology/tool state data integration process further comprises correlating said metrology data to corresponding tool state data.

13. A method, comprising:
performing a process step upon a workpiece using a processing tool;
acquiring metrology data relating to said processed workpiece;

acquiring tool state data relating to the tool state of a processing tool;

correlating said metrology data to said tool state data;

performing an assessment of a tool health related to said processing tool based upon said tool state data; and adjusting a weight of said metrology data based upon said assessment of said tool health.

14. The method of claim 13, further comprising qualifying said assessment of said tool health based upon an analysis performed upon said metrology data.

15. The method of claim 13, further comprising performing at least one of a feedback adjustment and a feed-forward adjustment to an operation relating to said processing tool based upon said adjusted metrology data.

16. A system, comprising:

a processing tool to process a workpiece; and a process controller operatively coupled to said processing tool, said process controller to perform a metrology/tool state data integration process based upon metrology data relating to said processed workpiece and tool state data relating to said processing tool, said metrology/tool state data integration process comprising performing an assessment of a tool health related to said processing tool and adjusting an emphasis of said metrology data based upon said assessment of said tool health.

17. The system of claim 16, wherein said workpiece is a semiconductor wafer.

18. The system of claim 16, further comprising:

a tool state data sensor unit operatively coupled to said process controller and to said processing tool, said tool state data sensor unit to acquire tool state data relating to an operation performed by said processing tool;

a metrology tool operatively coupled to said process controller and to said processing tool, said metrology tool to acquire metrology data relating to said processed workpiece;

a tool health analysis unit operatively coupled with said process controller, said tool health analysis unit to perform an assessment of a tool health relating to said processing tool;

a metrology/tool-health integration unit coupled to said process controller, said metrology/tool-health integration unit to correlate said tool state data and said metrology data to perform at least one of qualifying said metrology data based upon said tool health and qualifying said tool health based upon said metrology data; and a feedback/feed-forward unit operatively coupled with said process controller, said feedback/feed-forward unit to perform at least one of a feedback control and a feed-forward control of an operation relating said process controller based upon said qualified metrology data.

19. The system of claim 18, further comprising a database unit to store said at least one of metrology data, said tool state trace data, and said electrical test data.

20. The system of claim 18, wherein said tool state data sensor unit comprises at least one of a pressure sensor, gas flow sensor, temperature sensor, humidity sensor, and an electrical sensor.

21. An apparatus, comprising:

a process controller to perform a metrology/tool state data integration process based upon metrology data relating to a workpiece processed by a processing tool and tool state data relating to said processing tool, said metrology/tool state data integration process comprising performing an assessment of a tool health related to said processing tool and adjusting an emphasis of said metrology data based upon said assessment of said tool health.

22. The apparatus of claim 21, wherein said workpiece is a semiconductor wafer.

23. The apparatus of claims 21, further comprising:

a tool state data sensor unit operatively coupled to said process controller and to said processing tool, said tool state data sensor unit to acquire tool state data relating to an operation performed by said processing tool;

a metrology tool operatively coupled to said process controller and to said processing tool, said metrology tool to acquire metrology data relating to said processed workpiece;

a tool health analysis unit operatively coupled with said process controller, said tool health analysis unit to perform an assessment of a tool health relating to said processing tool;

a metrology/tool-health integration unit coupled to said process controller, said metrology/tool-health integration unit to correlate said tool state data and said metrology data to perform at least one of qualifying said metrology data based upon said tool health and qualifying said tool health based upon said metrology data; and a feedback/feed-forward unit operatively coupled with said process controller, said feedback/feed-forward unit to perform at least one of a feedback control and a feed-forward control of an operation relating said process controller based upon said qualified metrology data.

24. The apparatus of claim 23, wherein said tool state data sensor unit comprises at least one of a pressure sensor, gas flow sensor, temperature sensor, humidity sensor, and an electrical sensor.

25. A computer readable program storage device encoded with instructions that, when executed by a computer, performs a method, comprising:

performing a process step upon a workpiece using a processing tool;

acquiring manufacturing data relating to processing of said workpiece, said manufacturing data comprising metrology data relating to said processed workpiece and tool state data relating to the tool state of a processing tool; and performing a metrology/tool state data integration process based upon said acquired manufacturing data, said metrology/tool state data integration process comprising performing an assessment of a tool health related to said processing tool and adjusting an emphasis of said metrology data based upon said assessment of said tool health.

26. The computer readable program storage device encoded with instructions that, when executed by a computer, performs the method of claim 25, wherein performing said process step upon said workpieces further comprises performing said process step upon a semiconductor wafer.

27. The computer readable program storage device encoded with instructions that, when executed by a computer, performs the method of claim 25, the method further comprising qualifying said assessment of said tool health based upon an analysis performed upon said metrology data.

28. The computer readable program storage device encoded with instructions that, when executed by a computer, performs the method of claim 25, the method further comprising performing a feedback adjustment to an operation relating to said processing tool based upon said adjusted metrology data.

29. The computer readable program storage device encoded with instructions that, when executed by a computer, performs the method of claim 25, the method further comprising performing a feed-forward adjustment to an operation relating to another processing tool based upon said adjusted metrology data.

30. The computer readable program storage device encoded with instructions that, when executed by a computer, performs the method of claim 29, wherein qualifying said assessment of said tool health based upon an analysis performed upon said metrology data further comprises increasing a tool health indication in response to a determination that a control modification was implemented based upon said analysis performed upon said metrology data.

31. The computer readable program storage device encoded with instructions that, when executed by a computer, performs the method of claim 25, wherein performing an assessment of a tool health related to said processing tool further comprises performing an assessment of a tool health based upon said tool state data.

32. The computer readable program storage device encoded with instructions that, when executed by a computer, performs the method of claim 25, wherein acquiring manufacturing data relating to processing of said workpiece further comprises acquiring metrology data relating to the critical dimension relating to a feature formed upon said semiconductor wafer.

33. The computer readable program storage device encoded with instructions that, when executed by a computer, performs the method of claim 25, wherein acquiring manufacturing data relating to processing of said workpiece further comprises acquiring metrology data relating to a thickness associated with a layer formed upon said semiconductor wafer.

34. The computer readable program storage device encoded with instructions that, when executed by a computer, performs the method of claim 25, wherein acquiring said metrology data relating to said processed workpiece further comprises acquiring metrology data using a metrology tool.

35. The computer readable program storage device encoded with instructions that, when executed by a computer, performs the method of claim 25, wherein acquiring said tool state data relating to said processed workpiece further comprises acquiring at least one of a temperature data, a humidity data, a pressure data, and a gas flow rate data.

36. The computer readable program storage device encoded with instructions that, when executed by a computer, performs the method of claim 25, wherein performing a metrology/tool state data integration process further comprises correlating said metrology data to corresponding tool state data.

37. An apparatus, comprising:
means for performing a process step upon a workpiece using a processing tool;
means for acquiring manufacturing data relating to processing of said workpiece, said manufacturing data comprising metrology data relating to said processed workpiece and tool state data relating to the tool state of a processing tool; and
means for performing a metrology/tool state data integration process based upon said acquired manufacturing data, said metrology/tool state data integration process comprising performing an assessment of a tool health related to said processing tool and adjusting an emphasis of said metrology data based upon said assessment of said tool health.

* * * * *